US00RE35133E

United States Patent [19]

Halloran, Jr.

[11] E Patent Number: Re. 35,133

[45] Reissued Date of Patent: Dec. 26, 1995

[54] CHANNEL SIGN POST SOCKET AND METHOD OF INSTALLING SIGN POST

[75] Inventor: Charles F. Halloran, Jr., Chattanooga, Tenn.

[73] Assignee: Sign Post Products, Inc., Chattanooga, Tenn.

[21] Appl. No.: 219,118

[22] Filed: Mar. 29, 1994

Related U.S. Patent Documents

Reissue of:

[64] Patent No.: 5,104,265
Issued: Apr. 14, 1992
Appl. No.: 693,710
Filed: Apr. 30, 1991

[51] Int. Cl.[6] ..... E02D 5/54; E02D 5/22; E02D 7/02

[52] U.S. Cl. ..... 405/244; 405/249; 405/253; 52/165

[58] Field of Search ..... 405/231, 232, 405/244, 249, 253, 255; 52/155, 156, 158, 165

[56] References Cited

U.S. PATENT DOCUMENTS

| | | | |
|---|---|---|---|
| 1,844,871 | 2/1932 | Schmedes | 405/253 X |
| 2,269,646 | 1/1942 | Burke | 52/156 X |
| 2,282,049 | 5/1942 | Haggart | 405/244 |
| 3,727,357 | 4/1973 | Stillman | 52/155 X |
| 3,932,999 | 1/1976 | Todd | 405/249 |
| 4,252,472 | 2/1981 | Moraly | 405/244 |
| 4,320,608 | 3/1982 | Deike | 52/165 |
| 4,615,156 | 10/1986 | Deike | 52/165 X |
| 4,939,877 | 7/1990 | Claffey | 52/155 |
| 5,020,605 | 6/1991 | Leishman | 405/232 X |

FOREIGN PATENT DOCUMENTS

| | | | |
|---|---|---|---|
| 89624 | 7/1981 | Japan | 405/253 |

*Primary Examiner*—John A. Ricci
*Attorney, Agent, or Firm*—Alan Ruderman

[57] ABSTRACT

A socket and method for anchoring a sign post in the ground securely without requiring the sign post to be drivingly impacted. The socket has a hollow cavity having a cross sectional configuration substantially the same as that of the post, the cavity terminating at a ledge. The ledge is an edge of a portion of a leader inserted into one end of the socket and having the remainder of the leader extending from that one end. The socket is driven into the ground by inserting a driving rod into the cavity and impacting the driving rod against the ledge formed by the leader until the socket is driven to the desired depth in the ground. The driving rod is then withdrawn and the sign post is inserted into the socket and secured to it.

10 Claims, 1 Drawing Sheet

CHANNEL SIGN POST SOCKET AND METHOD OF INSTALLING SIGN POST

Matter enclosed in heavy brackets [ ] appears in the original patent but forms no part of this reissue specification; matter printed in italics indicates the additions made by reissue.

BACKGROUND OF THE INVENTION

This invention relates to the installation of channel post supported street signs and more particularly to a socket or sleeve and method for securely installing such channel sign posts in the ground rapidly, efficiently and inexpensively.

Flange shaped sign posts or channel posts in the prior art are installed in the ground by one of two methods. In the most popular method the top of the post is impacted manually or mechanically to drive the post to the required depth into the ground. Since such posts have lengths of generally eight to ten feet or more, the installation requires a worker assisted by at least a second worker to climb above the post to impact the top of the post either with a manually driven sledge or by the use of heavy hand-held equipment. This method clearly involves safety hazards because of the climbing involved and because at least one worker is substantially always working above the positional level of his head. If mechanical equipment is used to impact the top of the sign post, not only is at least one additional worker still required, but initial equipment costs and maintenance costs increase the expense of installing the sign. In the second method, a length of circular pipe having an inside diameter of approximately three and one-half inches is sealed at the bottom with a V-shaped configuration by swaging or the like, and the pipe is driven into the ground to a required depth of approximately 24 inches. The channel post is then inserted into the hollow of the pipe and a metal wedge is thereafter hammered into engagement with the channel post and the wall of the pipe to lock the post in position. This method requires large forces to impact the top of the pipe to displace the ground by the pipe, and also requires impacting of the wedge against the post. Thus, large hand-held mechanical impacting equipment is required which also necessitates the use of more than one worker and substantial equipment maintenance costs.

In a search of the prior art, the following patents were located relating to the impacting of a post, column or pipe into the ground: U.S. Pat. Nos. 4,665,994; 4,565,251; 4,315,551 and 2,902,832. In each case the post, column or pipe is struck on the end remote from the end entering the ground. A less relevant patent located during the search is U.S. Pat. No. 4,405,005 which relates to a log splitter impacted on the end remote from the log entering end. The aforesaid art confirms that the driving of a post or the like into the ground by striking it at the upper end presents inherent safety hazards.

SUMMARY OF THE INVENTION

Consequently, it is a primary object of the present invention to provide a socket adapted to be driven into the ground for receiving a channel sign post to be installed in the ground, and a method for installing the channel sign post in the ground.

It is another object of the present invention to provide a channel sign posts installation system requiring less workers and elimination of the climbing hazards inherent with prior art channel sign post installation systems.

It is a further object of the present invention to provide a method for installing channel sign posts in a safer manner and with a reduced number of workers than prior art methods.

It is a still further object of the present invention to provide a socket having a hollow interior conforming to the cross sectional configuration of a channel sign post, the socket having a closed end remote from the channel sign post receiving end, the closed end having a member adapted to be impacted for guiding the socket into the ground when the member is struck by a driving element positioned into the socket through the channel post receiving end.

Accordingly, the present invention provides a socket for receiving a channel shaped sign post, the socket having a hollow cavity including a cross sectional configuration substantially the same size and shape as the post, the socket adapted to be forcibly positioned within the ground and having a length sufficient to support the sign when so positioned. The cavity of the socket terminates at a ledge upon which the sign post is disposed when supported within the ground, the ledge being the trailing edge of a leader having substantially the same configuration as the sign post channel. The socket is driven into the ground by inserting a driving rod, preferably also having the same configuration as the sign post channel, into the socket and impacting the driving rod against the trailing edge of the leader, the driving rod extending only a small amount above the upper end of the socket. Thus, the socket is driven into the ground by impacting the leader from within the socket rather than impacting the upper end as in the prior art so that the impacting force is concentrated directly on the ground displacing leader. This reduces the force required to drive the socket into the ground compared to impacting on the top of the socket and permits the socket to be fabricated from sheet metal since upsetting of the top of the socket does not occur. After the socket has been driven into the ground to the desired length, the driving rod is removed and replaced with the sign post which may thereafter be bolted to the ground anchored sleeve. The leader preferably is a section of channel post and may include tapered side wings precluding loosening and removal of the socket from the ground.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 2:
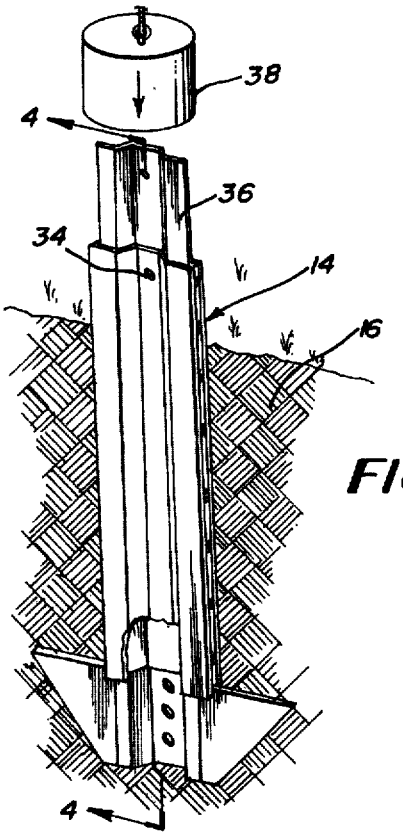
FIG. 2 is a perspective view partly broken away illustrating the method of installing the socket within the ground.
Figure 1:
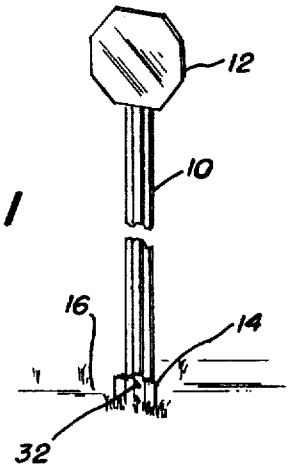
FIG. 1 is a perspective view of a sign having a channel shaped post installed within a socket constructed and positioned within the ground in accordance with the principles of the present invention.
Figure 4:
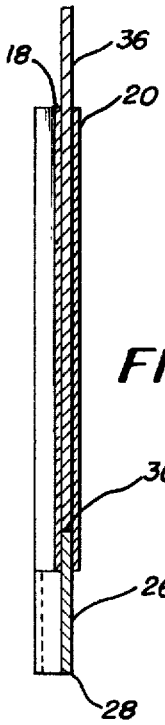
FIG. 4 is a cross sectional view taken substantially along line 4—4 of FIG. 2.
Figure 3:
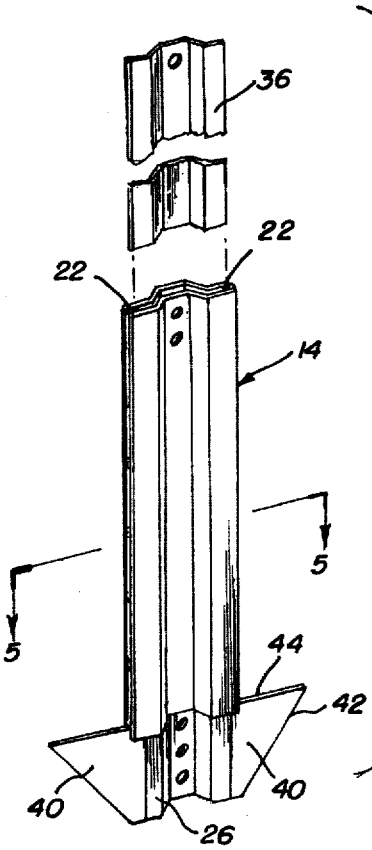
FIG. 3 is a perspective view illustrating the insertion of a driving rod into the socket in preparation for driving the socket into the ground, the driving rod being partly broken away for ease of illustration.

Referring now to the drawings, and in particular to FIG. 1, a sign post 10 having a sign 12 mounted to the upper end is secured within a socket entrapped in the ground 16, the socket 14 being constructed in accordance with the principles of the present invention. The sign post 10 has a substantially U-shape or channel shape cross sectional configuration and is generally known as a channel post. The sign post is conventional and is constructed from sheet metal of approximately 10 gauge thickness or the like, the channel shape being for the purpose of providing sufficient rigidity and load bearing capacity for bending and twisting forces. As is well known, and as illustrated in the drawings, the channel post 10 includes a central web disposed intermediate a pair of legs having outwardly extending wings at the ends thereof.

As aforesaid, conventional methods of mounting the channel post in the ground are either to impact the top of the post with a driving force or to insert and wedge the post into the hollow of a circular pipe driven into the ground by impacting the top thereof. The present invention overcomes the disadvantages of these methods by providing the socket 14 with an internal cross sectional configuration substantially identical to the cross sectional configuration of the channel post 10 so that the post is slidably receivable within the socket and is accommodated therein snugly with little or no play.

Figure 5:
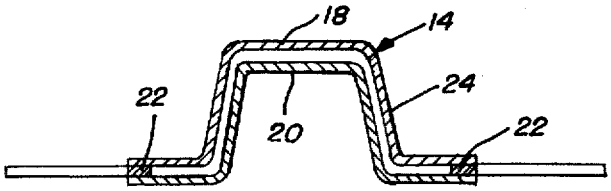
FIG. 5 is a cross sectional view taken substantially along line 5—5 of FIG. 3.

The socket 14 is metallic and, although it may be forged or extruded from steel, it is preferably fabricated from a pair of channel shaped members 18, 20, of substantially the same configuration as the channel post 14, the members 18 and 20 being spaced apart at the central web and leg portions and being connected together adjacent the outer ends of each wing portion by spacer members 22 so as to form a hollow internal cavity 24 in the unconnected space between the members 18 and 20, as illustrated best in FIG. 5. The members 18 and 20 may each be 20 gauge sheet metal and preferably are welded to the spacer members 22. The internal cavity 24 thus has a cross sectional configuration substantially identical to the channel post 10.

Adjacent the bottom of the socket there is a small section of channel post defining a leader 26 which has a portion received within the cavity and a portion of approximately two to three inches extending out thereof, the leader being secured to the socket by welding or the like at the lower most edge of at least one of the members 18, 20. The leader 26, which proceeds the socket into the ground, as hereinafter described, thus has a leading edge 28 disposed externally of the socket and a trailing edge defining a ledge 30 in the interior of the socket which closes the cavity at the bottom thereof. The sign post 10 may thus be received snugly within the cavity 24 when the socket is positioned in the ground 14 with the bottom edge of the sign post disposed on the ledge 30. The length of the socket is dependent upon the required depth of the sign post in the ground, the depth of course being dependent upon the overall length of the sign post for providing sufficient support thereto in the mounted position. A bolt 32 or the like may secure the sign post in the socket, the bolt being received through a hole 34 extending through the walls 18, 20 of the socket and through a corresponding aligned hole conventionally formed in the sign post 10. In order to drive the socket into the ground a driving rod 36 having a cross sectional shape equivalent to the sign post 10 is receivable within the cavity 24. The driving rod is slightly longer than the length of the socket from the ledge 30 to the upper edge of the socket, e.g., approximately five inches longer, so that the driving rod extends out the top of the socket by that amount when positioned within the cavity 24 and disposed on the ledge 30. The driving rod may then be impacted with a sledge or slide hammer 38 to drive the socket into the ground until the top of the socket is disposed slightly above the ground surface so that the bolt 32 my be inserted into the hole 34. Since the driving rod impacts the leader 26 at the ledge 36, the impacting force applied to the driving rod is concentrated at the leader and thus is efficiently utilized at a location immediately to the location where the ground is being displaced. Since the force is not applied to the top of the socket, the socket is not deformed by being upset or the like. Thus, there is no restriction to entry of the sign post into the socket.

In order to minimize the length of the socket and still ensure that the socket will be secured in the ground, a side wing 40 may be attached, as by welding, to the exterior portion of each side of the leader 26. The wings 40 preferably have a triangular shape with tapered side edges 42 for minimizing frictional resistance with the ground as the socket is being driven therein, yet the wings provide large upper edges 44 against which the ground acts to anchor the socket and-preclude extraction of the socket out of the ground after it has been installed.

It should thus be clear that in accordance with the method of the present invention the socket 14 is disposed initially on the surface of the ground, the driving rod inserted in the cavity 24, and the top of the driving rod impacted so as to impact the ledge 30 of the leader 26 to thereby drive the socket into the ground. Once the socket has been driven to the required depth, the driving rod is withdrawn and the sign post 10 is inserted therein, the sign post having the sign 12 previously mounted thereon. Accordingly, the present invention provides a socket for receiving a channel post mounted sign and the method of installing the sign by driving the socket into the ground by impacting a portion of the socket adjacent the end first entering the ground.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A socket for installing a sign post in the ground, said sign post having a substantially U-shape channel cross sectional configuration, said socket comprising a housing having wall means of finite length defining an elongated hollow cavity, said cavity having a U-shape cross sectional configuration substantially identical to that of said sign post for receiving said sign post snugly, a rigid leader having a U-shape cross sectional configuration substantially identical to said sign post, means for securing a portion of said leader including a free edge within said cavity to form a closure to said cavity at one end of said socket, the remaining portion of said leader extending out from said socket at said one end, said socket being adapted to be disposed in the ground with an end opposite said one end above the surface of the ground, whereby said sign post may be inserted into said socket through the end above the surface of the ground and abut said edge of said leader as a stop and may be secured to said socket adjacent said end disposed above the ground.

2. A socket as recited in claim 1, wherein said wall means comprises a pair of spaced apart walls having a cross sectional configuration substantially identical to said sign post, and means for securing lateral ends of said walls together in spaced apart relationship.

3. A socket as recited in claim 1, wherein said leader includes laterally extending wings on at least a part of said remaining portion for securely anchoring said socket within the ground.

4. A method for installing a sign post in the ground, said sign post having a [substantially U-shape] channel cross sectional configuration, [aid] *said* method comprising:

(a) providing a socket having an elongated hollow cavity with a cross sectional configuration substantially identical to the sign post;

(b) providing a rigid leader of finite length including first and second spaced apart distal edges and having a cross sectional configuration substantially identical to said sign post;

(c) securing said leader partly into said cavity adjacent one end of said socket with a first distal edge of said leader within said cavity to form a closure to said cavity at said one end while permitting the remainder of said leader including a second distal edge to extend from said one end;

(d) disposing said socket such that said second distal edge engages the surface of said ground;

(e) impacting said first distal edge of said leader from within said socket toward said ground to drive said leader together with said socket to a desired depth into said ground; and (f) inserting said sign post into said socket.

5. The method as recited in claim 4, wherein said impacting of said leader comprises inserting a driving rod into said cavity until it abuts said leader, and impacting said driving rod from outside said socket while maintaining the rod in abutment with said leader.

6. The method as recited in claim 5, wherein said inserting of said driving rod includes providing a driving rod having a cross sectional configuration substantially identical to said sign post.

7. The method as recited in claim 5, including removing said driving rod from said socket prior to inserting said sign post.

8. The method as recited in claim 7, wherein said impacting of said leader includes driving said socket so that a portion of said socket remains above the ground, and securing said sign post within said socket to the portion of said socket remaining above the ground after said sign post has been inserted into said socket.

9. The method of [driving a socket having a hollow interior into the ground to provide a supporting anchor for a sign post or the like, said method comprising] *installing a post in the ground comprising: providing a socket having a hollow interior,* providing a solid member having at least a portion with substantially the same cross sectional configuration as said hollow interior of said socket, positioning said portion of said member into one end of said socket with the remainder of said member extending from said one end, securing said member while so positioned to the socket, disposing the remainder of said member so as to engage the surface of said ground, inserting a driving rod *having substantially an identical cross sectional configuration as that of the hollow interior of said socket* into said socket and into abutment with said member [and] *to substantially fill the interior of the socket,* impacting said driving rod from outside said socket while maintaining abutment of said rod with said member to thereby impact said member from within said socket to drive said member and said socket into the ground to a desired depth, *and inserting said post into said socket and into abutment with said member.*

*10. A method of installing a post in the ground, said post having a predetermined cross sectional configuration, said method comprising providing a socket having an elongated hollow interior cavity with a cross sectional configuration substantially identical to the post, closing one end of said socket to form a seat within said socket, disposing said socket so that said one end engages the surface of said ground, inserting a driving rod having substantially an identical cross sectional configuration as that of the interior of said socket into said socket and into abutment with said seat to substantially fill the interior of the sockets, impacting said driving rod from outside said socket while maintaining abutment of said rod with said seat to thereby impact said seat from within said socket to drive said socket into the ground to a desired depth, and inserting said post into said socket and into abutment with said seat.*

* * * * *